(12) United States Patent
Amadei et al.

(10) Patent No.: US 10,746,334 B2
(45) Date of Patent: Aug. 18, 2020

(54) CONNECTOR FOR THE RECIPROCAL CONNECTION OF AN END MEMBER OF A WATER SUPPLY OR A SPRAYER AND A FLEXIBLE HOSE

(71) Applicant: FITT S.P.A., Sandrigo (VI) (IT)

(72) Inventors: Marco Amadei, Sandrigo (IT); Giuseppe Piccoli, Sandrigo (IT)

( * ) Notice: Subject to any disclaimer, the term of this patent is extended or adjusted under 35 U.S.C. 154(b) by 0 days.

(21) Appl. No.: 15/754,262

(22) PCT Filed: Jun. 15, 2017

(86) PCT No.: PCT/IB2017/053560
§ 371 (c)(1),
(2) Date: Feb. 21, 2018

(87) PCT Pub. No.: WO2017/216750
PCT Pub. Date: Dec. 21, 2017

(65) Prior Publication Data
US 2019/0093806 A1 Mar. 28, 2019

(30) Foreign Application Priority Data

Jun. 15, 2016 (IT) .......................... 102016000061556
Jun. 15, 2016 (IT) .......................... 102016000061565

(51) Int. Cl.
| F16L 33/22 | (2006.01) |
|---|---|
| F16L 19/06 | (2006.01) |
| F16L 33/207 | (2006.01) |
| F16L 29/00 | (2006.01) |

(Continued)

(52) U.S. Cl.
CPC ........... *F16L 33/224* (2013.01); *F16L 19/061* (2013.01); *F16L 19/065* (2013.01); *F16L 29/00* (2013.01); *F16L 29/02* (2013.01); *F16L 33/2078* (2013.01); *F16L 11/02* (2013.01); *F16L 11/12* (2013.01); *F16L 47/04* (2013.01)

(58) Field of Classification Search
CPC .. F16L 11/02; F16L 11/04; F16L 19/06; F16L 19/061; F16L 19/065; F16L 29/00;
(Continued)

(56) References Cited

U.S. PATENT DOCUMENTS 3,980,325 A * 9/1976 Robertson ............... F16L 19/08
285/249
4,257,629 A * 3/1981 Maple ................... F16L 33/222
285/12

(Continued)

FOREIGN PATENT DOCUMENTS

DE 202015100073 2/2015
DE 202015106514 U1 * 1/2016 ............ F16L 33/222
(Continued)

*Primary Examiner* — Hailey K. Do
(74) *Attorney, Agent, or Firm* — Themis Law (57) ABSTRACT

A connector for the reciprocal connection of an end member of a water supply or of a sprayer with a flexible hose includes a tubular main body defining an axis and having a first end portion for coupling with the end member and a second end portion that includes an elongated spigot, on which an end of the flexible hose may be fitted, and further includes an abutment wall, from which the elongated spigot extends. The connector also includes a substantially tubular shaped ring nut placed peripherally to the spigot and reciprocally screwable with the main body, and an annular pressure element interposed coaxially between the ring nut and the spigot.

20 Claims, 5 Drawing Sheets

(51) Int. Cl.
  *F16L 19/065*   (2006.01)
  *F16L 29/02*    (2006.01)
  F16L 11/02      (2006.01)
  F16L 47/04      (2006.01)
  F16L 11/12      (2006.01)

(58) Field of Classification Search
  CPC ....... F16L 29/02; F16L 29/33; F16L 29/2073;
           F16L 29/2075; F16L 29/2076; F16L
           29/2078; F16L 29/22; F16L 29/222; F16L
           29/223; F16L 29/224; F16L 29/23; F16L
           37/38; F16L 37/40; F16L 37/0925; F16L
                                  47/04; F16L 47/16
  See application file for complete search history.

(56) References Cited

U.S. PATENT DOCUMENTS

| | | | |
|---|---|---|---|
| 5,630,570 A * | 5/1997 | Lacroix | F16L 37/0985 |
| | | | 251/149.9 |
| 2009/0050836 A1* | 2/2009 | Chang | F16K 15/021 |
| | | | 251/353 |

FOREIGN PATENT DOCUMENTS

| | | | | |
|---|---|---|---|---|
| EP | 0875711 | | 11/1998 | |
| FR | 2468826 | | 5/1981 | |
| FR | 8303298 | | 9/1983 | |
| FR | 2703755 | A1 * | 10/1994 | ............ F16L 33/222 |
| WO | 2011161576 | | 12/2011 | |
| WO | 2012014122 | | 2/2012 | |

* cited by examiner

CONNECTOR FOR THE RECIPROCAL CONNECTION OF AN END MEMBER OF A WATER SUPPLY OR A SPRAYER AND A FLEXIBLE HOSE

FIELD OF THE INVENTION

The present invention is generally applicable to the technical field of connectors for flexible hoses, and it particularly relates to a connector for the reciprocal connection of an end member of a water supply or of a sprayer and a flexible hose, in particular a garden hose.

BACKGROUND OF THE INVENTION

Various types of connectors systems are known to connect flexible hoses to an end member, that may be threaded or not. In particular, connectors are known to connect garden hoses to the end member of a water supply, for instance a tap connected to the water network, or a sprayer.

Such connectors generally provide for a main body having a cylindrical spigot that is meant to be inserted inside the hose in correspondence to one end thereof, and a closing element, for example a ring nut that is screwed on the main body to radially compress a portion of the end of the hose against the spigot to obtain the hydraulic seal.

From the European Patent EP2047169 on behalf of the same Applicant a hose-connector assembly is known according with the aforementioned features.

Such connectors may be improved. In particular with regards to the hydraulic seal thereof.

Moreover, such a type of connectors is particularly ineffective in case the garden hose is an extendible hose, such as the hose made according to the teachings of International Application PCT/IB2016/059765.

Still, the known connectors are difficult to be mounted on the hose, especially in the case of an extendible hose.

SUMMARY OF THE INVENTION

Object of the present invention is to at least partially overcome the above mentioned drawbacks, by providing a connector for flexible hoses of high efficiency and relative low cost.

Another object of the present invention is to provide a connector having a high hydraulic and/or mechanical seal even in case of extendible flexible hoses.

Another object of the present invention is to provide a connector for flexible hoses that does not twist the hose upon the screwing of the ring nut on the threaded end member.

Another object of the present invention is to provide a connector for flexible hoses having easy insertion thereon.

Such objects, as well as others that will be clearer hereinafter, are fulfilled by a connector having one or more of the features herein described, shown and/or claimed.

Advantageous embodiments of the invention are described according to the appended claims.

BRIEF DESCRIPTION OF THE DRAWINGS

Further features and advantages of the invention will become more evident by reading the detailed description of a preferred but not exclusive embodiment of the invention, shown by way of not limitative example with the help of the annexed drawings, wherein.

DETAILED DESCRIPTION OF SOME PREFERRED EMBODIMENTS

With reference to the above mentioned figures, it is described a connector 1 for the reciprocal connection of an end member T of a water supply or of a sprayer and a hose H.

In particular, the hose H may be a garden hose to transport irrigation water.

The hose H may be a conventional flexible hose made, for instance, according to the teachings of European Patent EP0623776 on behalf of the same Applicant, or it may be an extendible flexible hose made, for example, according to the teachings of PCT/IB2016/059765, always on behalf of the same Applicant. On the other hand, the hose may be a flexible hose that enlarges under pressure made, for example, according to the teachings of PCT/IB2016/052435, always on behalf of the same Applicant.

The connector 1 may comprise a main body 10 of a substantially tubular shape that may define an axis X. In particular, the main body 10 may have a male or female end portion 11 for the coupling with the end member T and an opposite end portion 12 for the coupling with the hose H.

The end member T and the main body 10 may be coupled in a per se known manner, for example by means of male-female fast-coupling systems, by means of thread and counter-thread, or the like.

The end member T may be, for example, a tap connected to the water network or the end of a sprayer.

Figure 1:
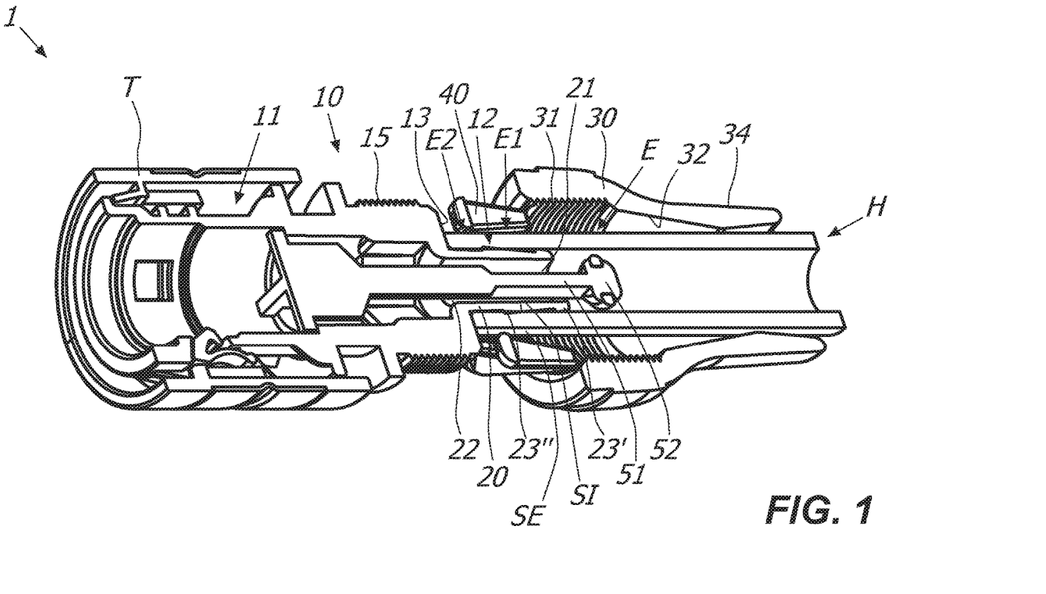
FIGS. 1 and 2 are an axonometric view in axial section of a connector 1 in two different operating phases.

Suitably, as particularly shown in FIG. 1, the end portion 12 may comprise an abutment wall 13 and an elongated spigot 20 extending from the latter, the spigot may be substantially coaxial to the main body 10. Therefore, the abutment wall 13 may be substantially annular and perpendicular to the axis X.

The flexible hose H may have at least one end E that may be fitted on the spigot 20 so as the water flows between the flexible hose H and the end member T. Suitably, therefore, the spigot 20 may include at least one inlet 21 and one outlet 22 for the water.

It is understood that the inner diameter of the end E of the flexible hose H may be substantially equal or slightly lower than the outer diameter of the spigot 20 to allow the former to be fitted on the latter.

According to an aspect of the invention, the spigot 20 may be configured so as to facilitate the insertion of the end E of the flexible hose H thereon.

Figure 2:
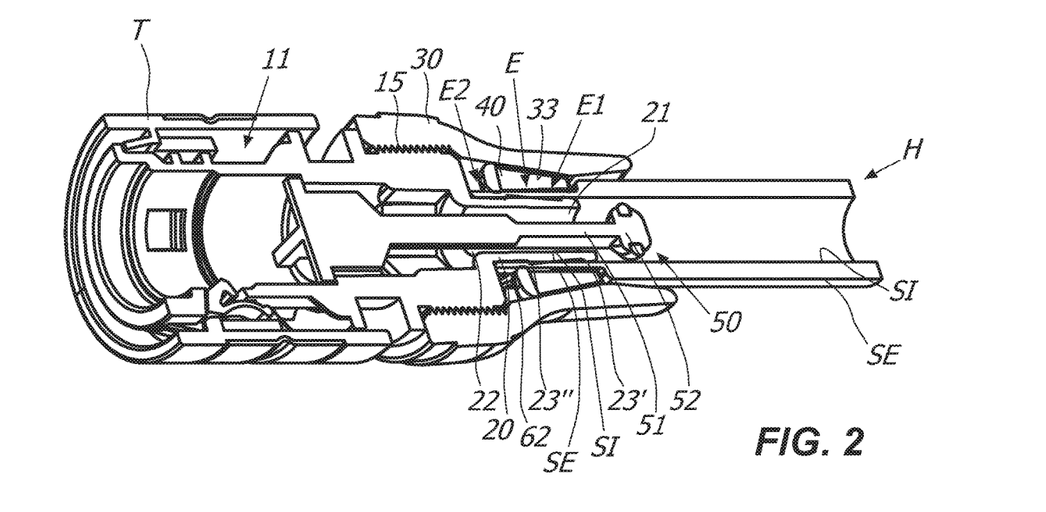

As shown in FIGS. 1 and 2, the spigot 20 may include at least one annular projection, preferably at least two annular projections 23', 23", diverging along the insertion direction of the flexible hose H. For example, the annular projections 23', 23" may have a truncated shape having a maximum diameter increasing towards the abutment wall 13 of the main body 10.

Preferably, the annular projection 23' distal from the abutment wall 13 may have a maximum diameter lower than the maximum diameter of the annular projection 23" proximal to the abutment wall 13.

In this way the insertion of the end E of the flexible hose H on the spigot 20 may be promoted, while the disengagement of the flexible hose H from the connector 1 may be penalized.

According to a particular embodiment, the connector 1 may comprise valve means 50 configured to block the outflow of water from the flexible hose H once the connector 1 is decoupled from the sprayer.

In particular, as shown in FIGS. 1 and 2, the valve means 50 may comprise a stem 51 with an end plug 52 coaxially inserted through the spigot 20 to selectively block the inlet thereof 21.

Suitably, the plug 52 may be diverging along the insertion direction of the flexible hose H so as to facilitate the insertion of the flexible hose H thereof on the spigot 20.

For example, the plug 52 may have a substantially semispherical shape. More particularly, the plug 52 may have a maximum diameter substantially equal to the inner diameter of the spigot 20 so as the latter and the plug 52 cooperate to define a substantially continuous invitation surface.

In this way, the reciprocal configuration of the plug 52 and of the spigot 20 may promote the insertion of the flexible hose H on the latter.

In particular, as better described hereinafter, the flexible hose H and the main body 10 may be coupled so as no water flows from the connector 1 during use.

To the object, at least one portion E1 of the end E of the flexible hose H may be radially pressed against the spigot 20 and then against the annular projections 23', 23" so as to obtain such a hydraulic seal of the connector 1.

Moreover, the latter may comprise a substantially tubular shaped ring nut 30 that may be placed peripherally to the spigot 20 so as to remain coaxial to the latter.

Figure 3:
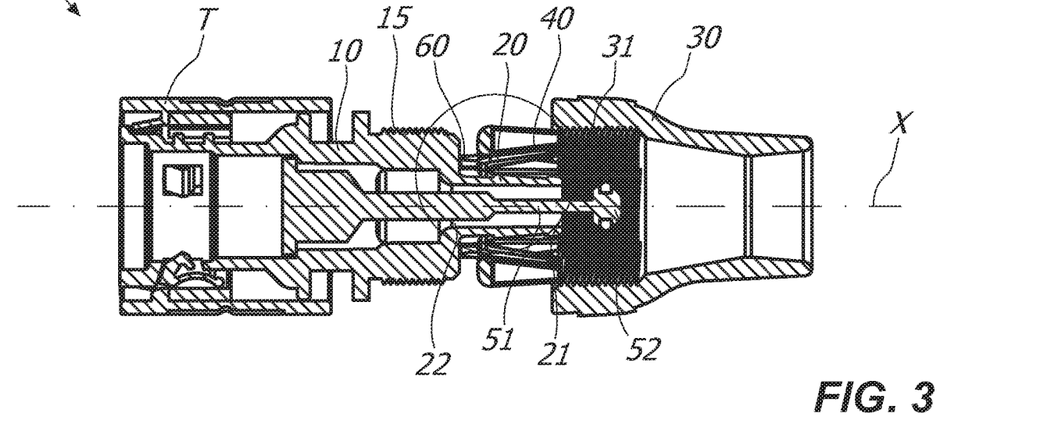
FIGS. 3, 4 and 5 are an axial section view of a connector 1 in different operating phases.
Figure 4:
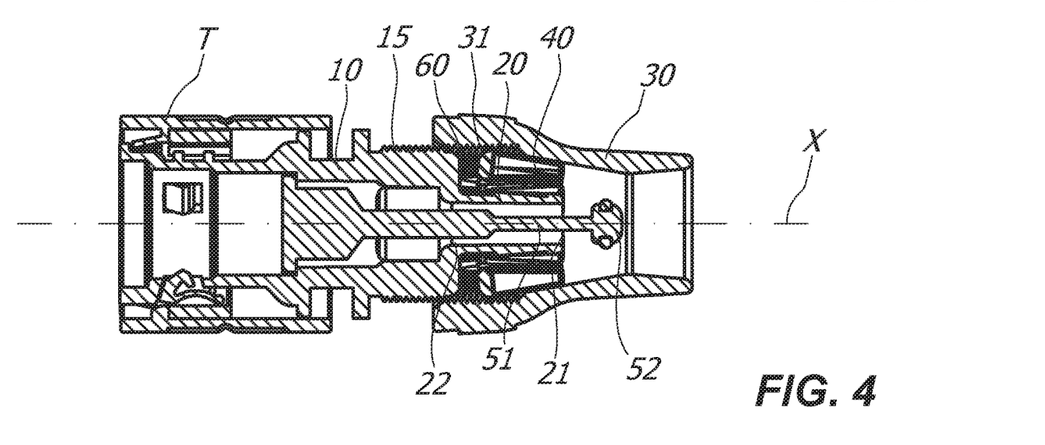
Figure 5:
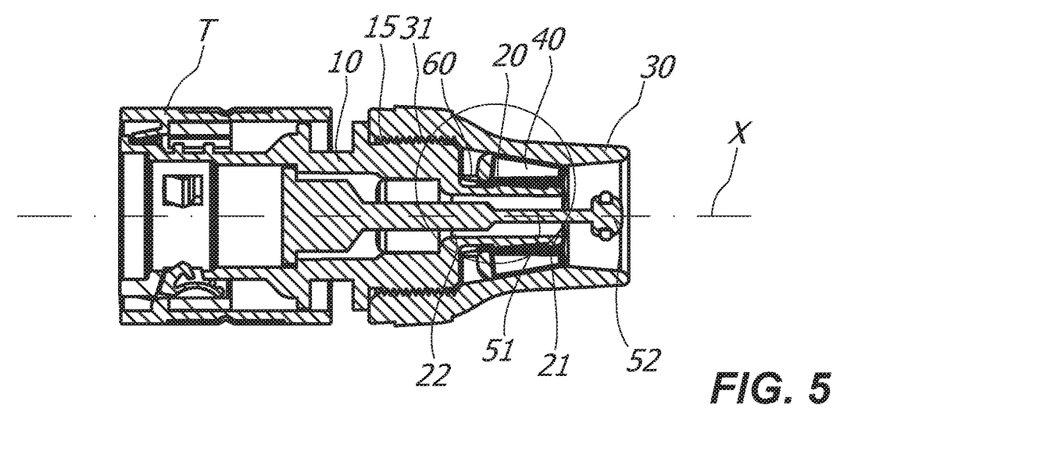

Suitably, as shown in FIGS. 3, 4 and 5, the ring nut 30 and the main body 10 may be reciprocally screwable so as to reciprocally move along the axis X upon the reciprocal twisting. For example, the main body 10 may have at least one threaded portion 15, while the ring nut 30 may have at least one respective counter-threaded portion 31 with respect to the former so as they are reciprocally screwable.

In particular, the portion E1 of the flexible hose H may then be interposed between the ring nut 30 and the spigot 20. Advantageously, the latter may be reciprocally configured so as the axial translation of the ring nut 30, that is upon the screwing thereof on the main body 10, corresponds to the radial compression of the portion E1 thereof of the flexible hose H as shown in FIG. 2.

To the object, the ring nut 30 may have an inner surface 32 at least partially truncated diverging with respect to the coupling direction of the flexible hose H and of the main body 10, that is, with respect to the axis X.

According to a particular aspect of the invention, the connector 1 may comprise an annular pressure element 40 interposed between the ring nut 30 and the spigot 20 coaxially to the latter. In particular, the pressure element 40 may have a substantially annular edge 42 faced to the abutment wall 13 of the main body 10.

Figure 7:
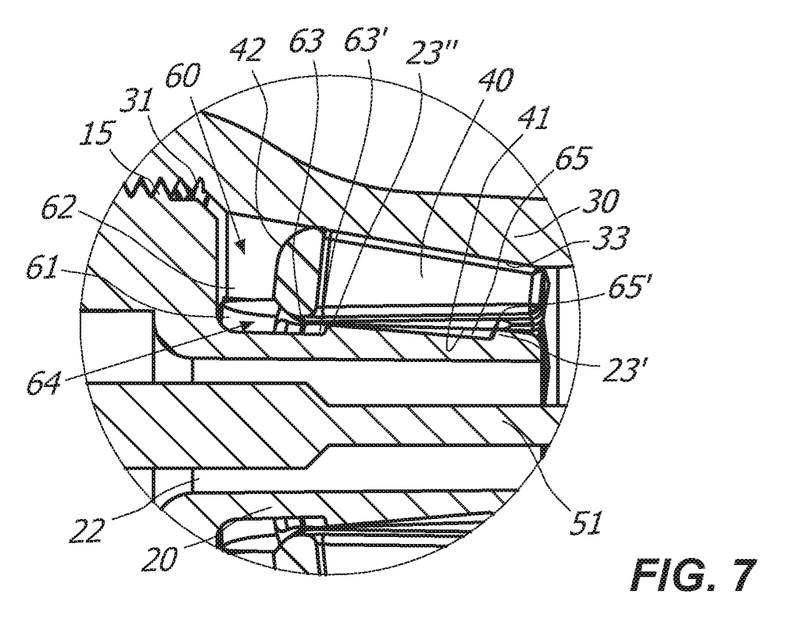
Figure 8:
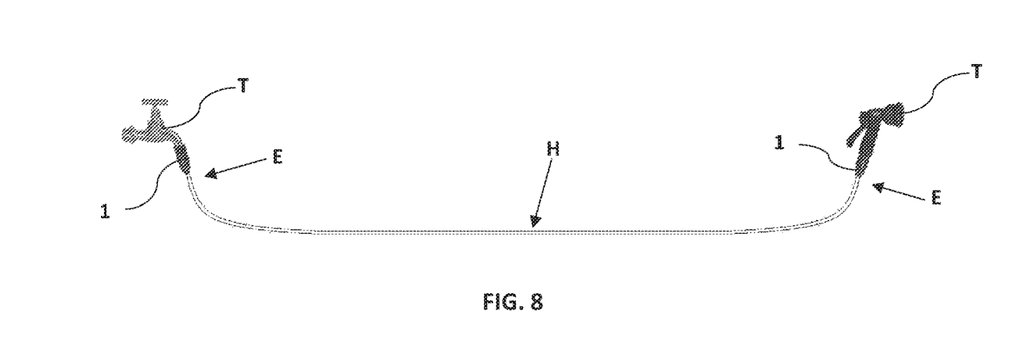
FIGS. 8, 9 and 10 are schematic views of an example of a flexible hose H, an end member T and a connector 1 during use.
Figure 9:
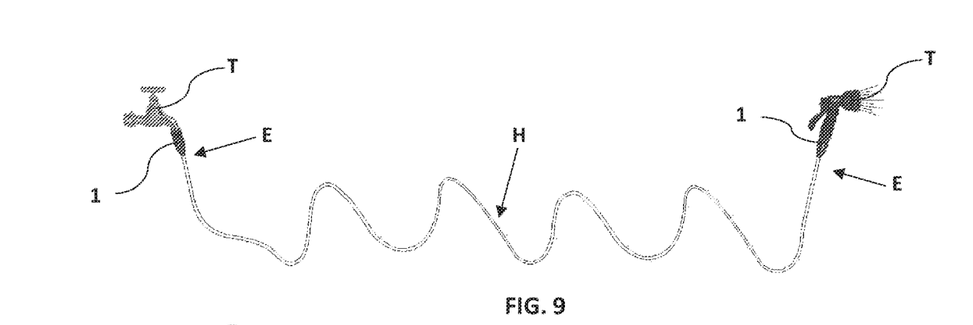
Figure 10:
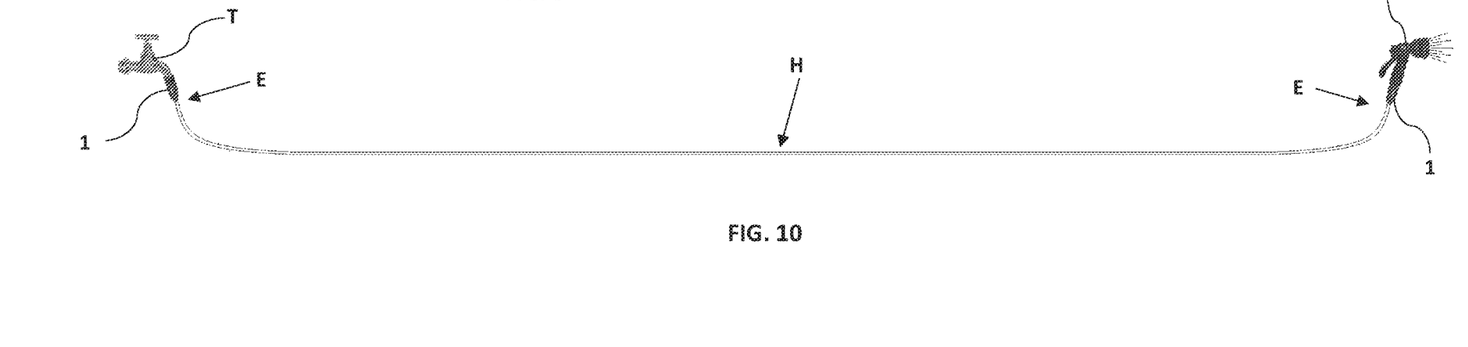
Figure 11:
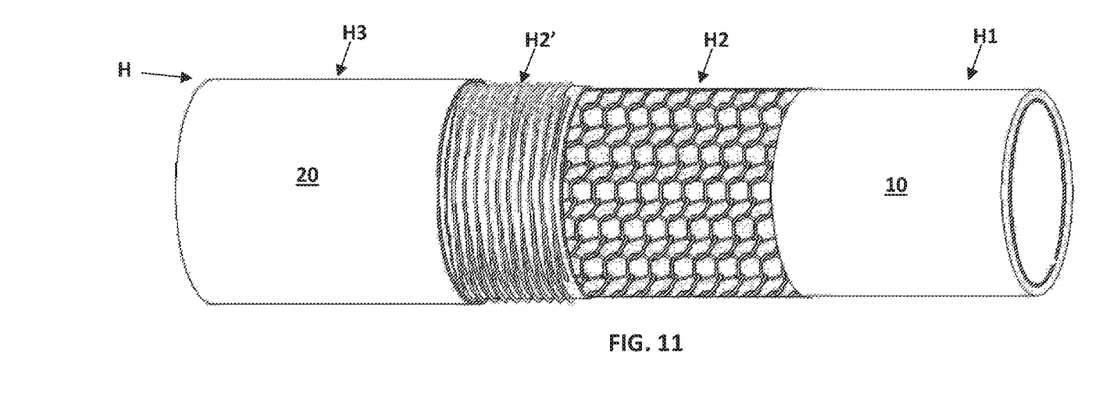
FIG. 11 is a schematic side view of the flexible hose H at rest.
Figure 12:
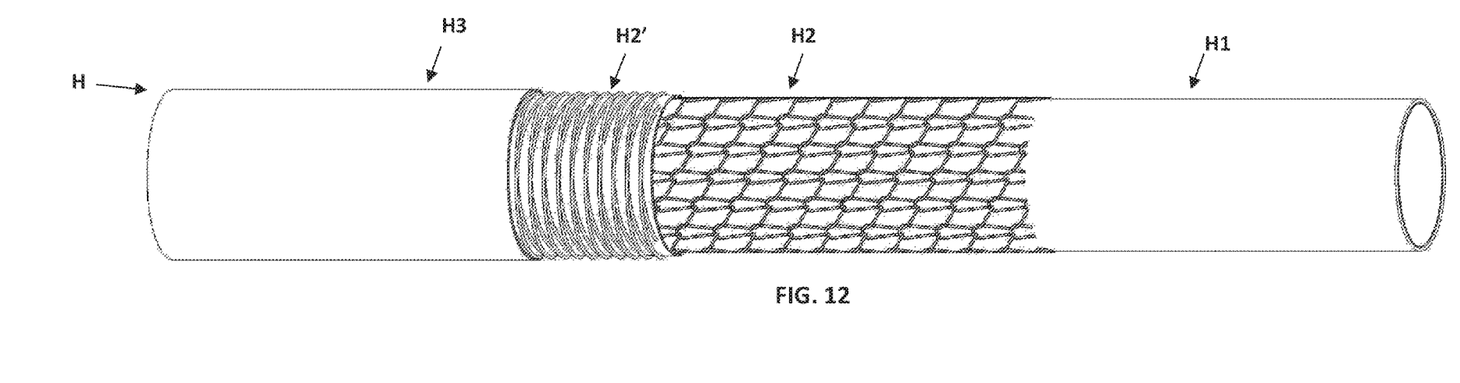
FIG. 12 is a schematic side view of the flexible hose H of FIG. 11 under pressure.

As particularly shown in FIG. 7, the ring nut 30, and in particular at least one portion 33 of the inner surface 32 thereof, may interact with the pressure element 40 upon the screwing thereof on the main body 10 so as the latter exerts a radial pressure on the portion E1 of the flexible hose H.

In other words, the end E of the flexible hose H may have an outer surface SE in contact with the inner surface 41 of the pressure element 40, and an inner surface SI in contact with one or more annular projections 23', 23" of the spigot 20 so as to obtain the hydraulic seal of the connector 1.

Moreover, thanks to such a feature, the mechanical seal of the connector 1 may also be obtained.

Suitably, the pressure element 40 may be of variable configuration. In particular, the latter may be configured so as upon the screwing of the ring nut 30 the pressure element moves from an enlarged configuration to a contracted configuration to exert the radial pressure on the portion E1 of the flexible hose H.

For example, the pressure element 40 may have an annular shape and may consist of a substantially truncated shape single body formed by a continuous full-length tubular structure with a constant cross-section.

In this way, upon the contraction thereof, the pressure element 40 may exert a uniform pressure on the peripheral development of the portion E1 of the flexible hose H so as to preserve the entirety of the flexible hose H thereof.

Advantageously, the pressure element 40 thanks to the configuration thereof may be in contact with the outer surface SE of the end E of the flexible hose H during the passage from the enlarged configuration to the contracted configuration.

Moreover, during the screwing of the ring nut 30 on the hinge body 10, the pressure element 40 may radially compress to assume the contracted configuration thus avoiding to rotate around the axis X integrally with the ring nut 30. In this way, upon the coupling with the main body 10, the twisting of the flexible hose H, and particularly of the end E, may be avoided and, therefore, the damage thereof.

Figure 6:
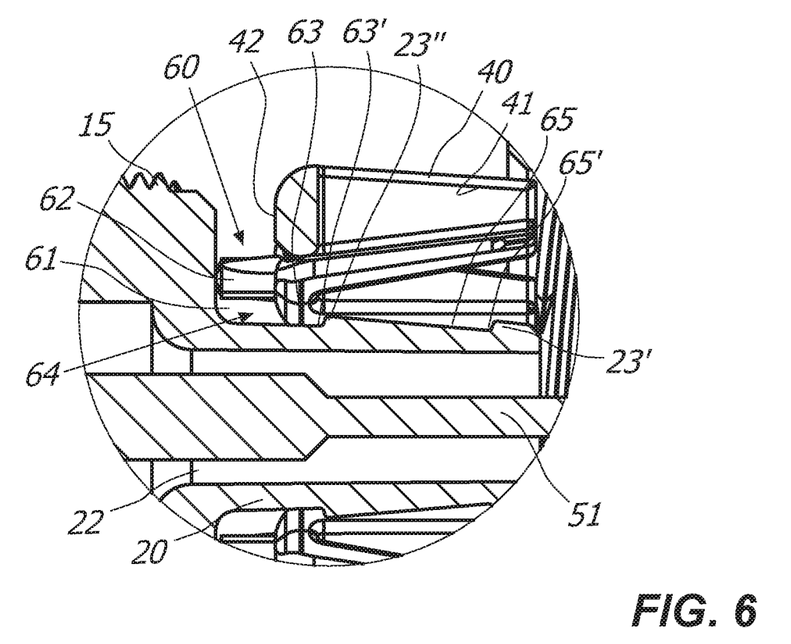
FIGS. 6 and 7 are an enlarged view of some details respectively of FIG. 3 and FIG. 5.

According to another aspect of the invention, as shown in FIGS. 6 and 7, the edge 42 and the abutment wall 13 may be reciprocally spaced apart so as to obtain an annular seat 61 therebetween.

In particular, the end E of the flexible hose H may comprise the portion E1 susceptible to be compressed by the pressure element 40 and a portion E2 susceptible to expand in the annular seat 61 as better explained hereinafter.

Suitably, the connector 1 may comprise spacer means 60 to keep the pressure element 40 and the abutment wall 13 reciprocally spaced apart so as to define the thickness of the annular seat 61.

In particular, the spacer means 60 may include a plurality of elongated elements 62 interposed between the pressure element 40 and the abutment wall 13. More in detail, the elongated elements 62 extend from the annular edge 42 of the pressure element 40 to come in contact with the abutment wall 13.

In this way, even after the screwing of the ring nut 30 on the main body 10, the pressure element 40 may remain spaced apart from the abutment wall 13 to form the annular seat 61.

According to a further aspect of the invention, the main body 10, the ring nut 30 and the pressure element 40 may be reciprocally dimensioned and/or configured so as the radial pressure of the latter is exerted more near the annular projection 23" of the spigot 20 proximal to the abutment wall 13, that is, the annular projection opposite to the annular projection 23' proximal to the inlet 21.

Possibly, the pressure element 40 may have a substantially truncated configuration.

Moreover, the annular projection 23" and the spacer means 60 may be reciprocally dimensioned so as the annular projection 23" remains spaced apart from the annular seat 61.

In particular, the elongated elements 62 may have a length such that a tubular interspace 63 cooperating with the annular seat 61 to define an expansion chamber 64 may be defined between the annular projection 23" and the abutment wall 13.

In this way, as a result of the action of the pressure element 40, the portion E2 of the flexible hose H, that is the portion downstream of the annular projection 23", may occupy the expansion chamber 64.

Possibly, such a portion E2 may expand due to the pressure variation inside the flexible hose H due to the passage of water inside the flexible hose H thereof.

In this way, the hydraulic seal and the mechanical seal of the connector may be locally increased during use.

Furthermore, advantageously, the tubular interspace 63 may have a narrow portion 63' in correspondence to the annular projection 23" so as to define an area designed to counteract the pulling of the flexible hose H.

Suitably, the space between the annular projection 23" and the annular projection 23' may define a tubular interspace 65. In particular, the latter may have a narrow portion 65' in correspondence to the annular projection 23' so as to create a further area designed to counteract the pulling of the flexible hose H.

In this way, it may be impossible to decouple the end E of the flexible hose H and the main body 10 during use.

Such a feature may be particularly advantageous in case the flexible hose H is an extendible hose.

Operatively, the user may first insert the ring nut 30 and then the pressure element 40 around the flexible hose H.

Subsequently, the user may insert the end E of the flexible hose H on the spigot 20 so as the former is close to/in contact with the abutment wall 13.

By acting on the outer surface 34 of the ring nut 30, the user may screw the latter on the coupling portion 12 of the main body 10 so as to radially compress the pressure element 40 and, therefore, the end E of the flexible hose H so as to obtain a hydraulic and mechanical seal of the connector 1 as described above.

The connector 1 is particularly advantageous in case of extendible flexible hose H.

The flexible hose H may have a not corrugated nor coiled tubular structure, typical of irrigation hoses or garden hoses. The polymeric layers may be tubular.

An example of corrugated hose is known from document U.S. Pat. No. 3,028,290, while an example of coiled hose is known from document U.S. Pat. No. 4,009,734.

The extendible flexible hose H may comprise at least one inner layer H1 made of a first elastic polymeric material, at least one outer layer H3 made of a second elastic polymeric material and at least one textile reinforcement layer H2 interposed therebetween.

The at least one inner layer H1 and the at least one outer layer H3 may be coupled therebetween to form a unitary tubular element that embeds, that is, embodies, at least one textile layer H2.

To the object, the at least one outer layer H3 and the at least one inner layer H1 may be reciprocally coupled in correspondence to the areas of the outer surface of the at least one inner layer H1 that are not covered by the textile reinforcement layer H2. In other words, the at least one outer layer H3 and the at least one inner layer H1 may be reciprocally coupled except in the areas occupied by the textile yarns of the at least one textile layer H2.

Suitably, the unitary tubular element may have an elasticity such to automatically elongate and enlarge under the working pressure imparted by the liquid flowing therethrough to increase the original length thereof and such to automatically recover once the working pressure stops to assume again the original length and diameter.

The elongation is considerable and significant to the naked eye, while the enlargement may be more limited and possibly not significant to the naked eye.

To the object, the first and second elastic polymeric materials that form the unitary tubular element should be suitably chosen.

The first and second polymeric materials may be elastomers or thermoplastic elastomers (TPE).

Possible TPE may be TPE-S, such as PP/SEBS or PP/EPDM, or TPE-O, such as Ethylene-Ottene copolymer.

Possible elastomers may be natural rubber or latex.

Suitably, the unitary tubular element as a whole may have a Shore A hardness measured according to ASTM D2240 (3") of 30 ShA to 50 ShA.

The textile yarns that make the at least one textile layer may be polyester, nylon 6,6, Polyvinyl Alcohol, para-aramid fibers, meta-aramid fibers, Rayon®.

Advantageously, the textile yarns forming the at least one textile layer H2 may have an elongation at break measured according to BISFA (Cap 7) lower than 30% and preferably lower than 25%.

Advantageously, the textile yarns forming the at least one textile layer H2 may have a toughness measured according to BISFA (Cap 7) of at least 50 cN/tex.

In a per se known manner, the elongation and the automatic enlargement of the latter are promoted by one or more restrictions or flow restrictors inserted in or connected to the hose, for instance as taught in EP 2520840 and/or EP2778491 which reference is made for consultation.

Preferably, the connector 1 may act as a flow restrictor and it promotes the elongation of the hose H. For example, the plug 52 and/or the spigot 20 may act as flow restrictors.

Suitably, one of the ends of the hose H may be connected to delivery means of the fluid to be transported, such as a tap, by means of the connector 1.

As known, in a flexible hose a textile reinforcement layer H2 if stressed tends to axially elongate and radially expand, depending on the type.

Advantageously, the at least one textile reinforcement layer H2 of the extendible flexible hose of the present invention may be susceptible to move between a rest configuration that it assumes at rest, that is when the liquid does not flow through the unitary tubular element, and a working configuration that it assumes when the unitary tubular element is stressed by the working pressure of the liquid flowing therethrough.

In the working configuration, the at least one textile reinforcement layer H2 axially elongates and radially enlarges to accompany the elongation and the enlargement of the unitary tubular element.

Depending on whether the yarns forming the textile reinforcement layer are elastic or rigid, such elongation and enlargement are more or less marked.

However, the yarns forming the textile reinforcement layer may be preferably rigid, so as to effectively act upon the unitary tubular element upon the elongation thereof.

Preferably, the at least one textile reinforcement layer and the unitary tubular element may be reciprocally configured so as the former intercepts the latter upon the elongation and enlargement thereof so as to determine the maximum length and diameter thereof.

In other words, with the same inner pressure of the hose the axial elongation and the maximum radial enlargement of the at least one textile reinforcement layer is lower than the axial elongation and the maximum radial enlargement of the unitary tubular element, so that the axial elongation and the maximum radial enlargement of the at least one textile reinforcement layer determines the axial elongation and the maximum radial enlargement of the flexible hose as a whole.

Suitably, the automatic recovery of the unitary tubular element may allow the at least one textile reinforcement layer to assume again the rest configuration once the inner pressure of the flexible hose stops.

Such an automatic recovery of the unitary tubular element may only be accomplished thanks to the elasticity thereof, without any other help. In particular, the flexible hose of the present invention may be free of helical springs or similar automatic recovery means.

Thanks to one or more of the previous features, it is possible to obtain an extendible flexible hose that is manageable and practical to use.

As above mentioned, the stress of the inner pressure inside the hose may tend not only to axially elongate it, but also to make it expand radially.

In this case, the unitary tubular element may have the original diameter thereof when the at least one textile reinforcement layer is in the rest configuration and an expanded diameter when the at least one textile reinforcement layer is in the working configuration.

Preferably, the flexible hose H may comprise at least one first textile layer H2 and at least one second textile layer H2', reciprocally superimposed but not necessarily in reciprocal contact.

The at least one first textile layer H2 and the unitary tubular element may be reciprocally configured so as the former intercepts the latter upon the elongation thereof to determine the maximum length thereof, while the at least one second textile layer H2' and the unitary tubular element may be reciprocally configured so as the former intercepts the latter upon the enlargement thereof so as to determine the maximum diameter thereof.

The extendible flexible hose H may be realized by means of a method that may sequentially comprise the following steps: a) providing of the at least one inner layer; b) making on the at least one inner layer of the at least one textile reinforcement layer to produce a semi-finished product; and c) extrusion on the semi-finished product of the at least one outer layer.

Suitably, the step c) of extrusion of the at least one outer layer may include a step of coupling of the latter and of the at least one inner layer to form the unitary tubular element so as the at least one textile layer is embedded therein.

Advantageously, the first and second elastic polymeric materials may be reciprocally compatible so as the coupling between the at least one inner layer and the at least one outer layer is accomplished upon the step of c) of extrusion of the at least one outer layer.

Preferably, the steps b) of making of the at least one textile reinforcement layer and c) of extrusion of the at least one outer layer may be realized with the at least one inner layer elongated with respect to the original length thereof.

In a preferred embodiment of the invention, the elongation step of the at least one inner layer may be accomplished by drawing thereof, preferably by means of two or more pairs of rotating facing cylinders susceptible to press the hose.

A first pair of cylinders may press the hose before step b) of making of the at least one textile reinforcement layer, while a second pair may press the hose after step c) of extrusion of the at least one outer layer. Advantageously, the second pair of cylinders may rotate faster than the first pair of cylinders.

In order to facilitate the detachment of the inner layer once pressed by the above mentioned cylinders, the at least one inner layer may internally include a detachable film.

In light of the foregoing, it is understood that the invention fulfils the intended objects.

The invention is susceptible of numerous modifications and variations, all falling within the inventive concept expressed by the appended claims. All details may be replaced by other technically equivalent elements and the materials may be different according to requirements without departing from the scope of the invention defined by the appended claims.

The invention claimed is:

1. A connector for reciprocal connection of an end member of a water supply or of a sprayer with a flexible hose having an end, comprising:
a main tubular body defining an axis and having,
a first end portion adapted to be coupled to the end member, and
a second end portion that includes an elongated spigot adapted to be fitted within the end of the flexible hose and an abutment wall from which the elongated spigot extends;
a tubular shaped ring nut adapted to be screwed onto the main tubular body so that the tubular shaped ring nut is placed peripherally to the elongated spigot; and
an annular pressure element adapted to be coaxially interposed between the tubular shaped ring nut and the elongated spigot, the annular pressure element having a variable configuration so as to move from an enlarged configuration to a contracted configuration, the annular pressure element further having a truncated tubular shape defined by a continuous member extending between a proximal end and a distal end of the annular pressure element in a zig zag pattern,
wherein the tubular shaped ring nut, upon screwing on the main tubular body, interacts with the annular pressure element to cause the annular pressure element to contract and exert a radial pressure on the end of the flexible hose once the end of the flexible hose is fitted on the elongated spigot, so as to promote during use an expansion of the end of the flexible hose, the annular pressure element having a proximal annular edge facing the abutment wall of the main tubular body, and
wherein a plurality of elongated spacer members extend proximally from the annular pressure element to become interposed between the annular edge and the abutment wall to maintain reciprocally spaced apart the annular pressure element and the main tubular body, so as to define therebetween an annular seat adapted to receive the expanded end of the flexible hose.

2. The connector according to claim 1, wherein the plurality of elongated spacer members extend from the annular edge of the annular pressure element to come in contact with the abutment wall.

3. The connector according to claim 1, wherein the tubular shaped ring nut is configured to cause the annular pressure element, upon the screwing of the tubular shaped ring nut, to move from an enlarged configuration to a contracted configuration to exert the radial pressure.

4. The connector according to claim 3, wherein the annular pressure element is a single body having a frusto-conical shape made from a continuous full-length tubular structure with a constant cross-section, whereby, upon a contraction of the annular pressure element, the annular pressure element exerts a uniform pressure on the end of the flexible hose.

5. The connector according to claim 1, wherein the elongated spigot includes an inlet and an outlet for a fluid.

6. The connector according to claim 5, further comprising a valve cooperating with the elongated spigot to selectively block the inlet thereof.

7. The connector according to claim 6, wherein the valve comprises a stem coaxially inserted through the elongated spigot and an end plug connected to the stem to selectively block the inlet.

8. The connector according to claim 7, wherein the elongated spigot includes a plurality of annular projections of serrated shape diverging along an insertion direction of the flexible hose.

9. The connector according to claim 8, wherein the main tubular body, the tubular shaped ring nut, and the annular pressure element are reciprocally dimensioned or configured to cause the radial pressure of the annular pressure element to be exerted more near one of the plurality of annular projections of the elongated spigot which is proximal to the abutment wall, the abutment wall and the plurality of elongated spacer members being reciprocally dimensioned to cause the proximal annular projection to be spaced apart from the annular seat, whereby, between the proximal annular projection and the abutment wall, a first tubular interspace is created cooperating with the annular seat to define an expansion chamber for a portion of the flexible hose downstream of the proximal annular projection.

10. The connector according to claim 9, wherein the first tubular interspace has a narrow portion in correspondence to the proximal annular projection, thereby defining a first area designed to counteract a pulling of the flexible hose.

11. The connector according to claim 10, wherein a space between the plurality of annular projections defines a second tubular interspace having a narrow portion in correspondence to one of the plurality of annular projections distal from the abutment wall thereby defining a second area designed to counteract the pulling of the flexible hose.

12. The connector according to claim 8, wherein the plurality of annular projections have a maximum diameter increasing toward the abutment wall.

13. The connector according to claim 12, wherein the end plug also has a shape diverging along the insertion direction of the flexible hose so as to simplify an insertion operation.

14. The connector according to claim 13, wherein the end plug has a maximum diameter equal to an inner diameter of the elongated spigot, thereby causing the elongated spigot and the end plug to cooperate and define a continuous insertion surface.

15. The connector according to the claim 14, wherein the end plug has a semi-spherical shape.

16. A system comprising:
an extendible flexible hose to transport liquids, the extendible flexible hose having an end;
a connector for a reciprocal connection of an end member of a water supply or of a sprayer and the end of the extendible flexible hose;
wherein the connector comprises:
a main tubular body defining an axis and having,
a first end portion adapted to be coupled to the end member, and
a second end portion that includes an elongated spigot adapted to be fitted within the end of the extendible flexible hose and an abutment wall from which the elongated spigot extends;
a tubular shaped ring nut adapted to be screwed onto the main tubular body so that the tubular shaped ring nut is placed peripherally to the elongated spigot; and
an annular pressure element adapted to be coaxially interposed between the tubular shaped ring nut and the elongated spigot, the annular pressure element having a variable configuration so as to move from an enlarged configuration to a contracted configuration, the annular pressure element further having a truncated tubular shape defined by a continuous member extending between a proximal end and a distal end of the annular pressure element in a zig zag pattern,
wherein the tubular shaped ring nut, upon screwing on the main tubular body, interacts with the annular pressure element to cause the annular pressure element to contract and exert a radial pressure on the end of the extendible flexible hose once the end of the extendible flexible hose is fitted on the elongated spigot, so as to promote during use an expansion of the end of the extendible flexible hose, the annular pressure element having a proximal annular edge facing the abutment wall of the main tubular body, and
wherein the annular wherein the annular pressure element includes a plurality of elongated spacer members that extend proximally from the annular pressure element to become interposed between the annular edge and the abutment wall to maintain reciprocally spaced apart the annular pressure element and the main tubular body, so as to define therebetween an annular seat adapted to receive the end of the extendible flexible hose after the expansion,
wherein the extendible flexible hose comprises:
an inner layer made of a first elastic polymeric material;
an outer layer made of a second elastic polymeric material; and
a textile reinforcement layer interposed between the inner layer and the outer layer,
wherein the inner layer and the outer layer are reciprocally coupled to form a unitary tubular element, the textile reinforcement layer being embedded therebetween,
wherein the unitary tubular element has an elasticity causing the unitary tubular element to automatically elongate and enlarge under a working pressure imparted by a liquid flowing therethrough and to increase an original length and diameter of the unitary tubular element, the unitary tubular element automatically recovering once the working pressure stops to assume again the original length and diameter, and
wherein the textile reinforcement layer is adapted to move between a rest configuration existing when no liquid flows through the unitary tubular element and a working configuration existing when the unitary tubular element is elongated and enlarged by the working pressure.

17. The system according to claim 16, wherein the automatic elongation and enlargement of the unitary tubular element promotes a passage of the textile layer from the rest configuration to the working configuration, the automatic recovery of the unitary tubular element promoting the passage of the textile layer from the working configuration to the rest configuration.

18. The system according to claim 16, wherein the textile reinforcement layer and the unitary tubular element are reciprocally configured to cause the textile reinforcement layer to intercept the unitary tubular element upon the elongation and enlargement thereof so as to determine a maximum length and diameter thereof.

19. The system according to claim 16, wherein the textile reinforcement layer is placed on an outer surface of the inner layer to leave thereon a plurality of uncovered areas, the outer layer and the inner layer being reciprocally coupled at the uncovered areas.

20. A system comprising:
an extendible flexible hose to transport liquids, the extendible flexible hose having an end;
a connector for a reciprocal connection of an end member of a water supply or of a sprayer and the end of the extendible flexible hose;
wherein the connector comprises:
a main tubular body defining an axis and having,
  a first end portion adapted to be coupled to the end member, and
  a second end portion that includes an elongated spigot adapted to be fitted within the end of the extendible flexible hose and an abutment wall from which the elongated spigot extends;
a tubular shaped ring nut adapted to be screwed onto the main tubular body so that the tubular shaped ring nut is placed peripherally to the elongated spigot; and
an annular pressure element adapted to be coaxially interposed between the tubular shaped ring nut and the elongated spigot, the annular pressure element having a variable configuration so as to move from an enlarged configuration to a contracted configuration, the annular pressure element further having a truncated tubular shape defined by a continuous member extending between a proximal end and a distal end of the annular pressure element in a zig zag pattern,
wherein the tubular shaped ring nut, upon screwing on the main tubular body, interacts with the annular pressure element to cause the annular pressure element to contract and exert a radial pressure on the end of the extendible flexible hose once the end of the extendible flexible hose is fitted on the elongated spigot, so as to promote during use an expansion of the end of the extendible flexible hose, the annular pressure element having a proximal annular edge facing the abutment wall of the main tubular body, and
wherein the annular pressure element includes a plurality of elongated spacer members that extend proximally from the annular pressure element to become interposed between the annular edge and the abutment wall to maintain reciprocally spaced apart the annular pressure element and the main tubular body, so as to define therebetween an annular seat adapted to receive the end of the extendible flexible hose after the expansion,
wherein the extendible flexible hose comprises:
an inner layer made of a first elastic polymeric material;
an outer layer made of a second elastic polymeric material; and
a textile reinforcement layer interposed between the inner layer and the outer layer,
wherein the inner layer and the outer layer are reciprocally coupled to form a unitary tubular element, the textile reinforcement layer being embedded therebetween,
wherein the unitary tubular element has an elasticity causing the unitary tubular element to automatically elongate and enlarge under a working pressure imparted by a liquid flowing therethrough and to increase an original length and diameter of the unitary tubular element, the unitary tubular element automatically recovering once the working pressure stops to assume again the original length and diameter,
wherein the textile reinforcement layer is adapted to move between a rest configuration existing when no liquid flows through the unitary tubular element and a working configuration existing when the unitary tubular element is elongated and enlarged by the working pressure, and
wherein the first and the second elastic polymeric materials are elastomers or thermoplastic elastomers, the unitary tubular element having a Shore A hardness measured according to ASTM D2240 (3") of 30 ShA to 50 ShA.

* * * * *